Figure 1:
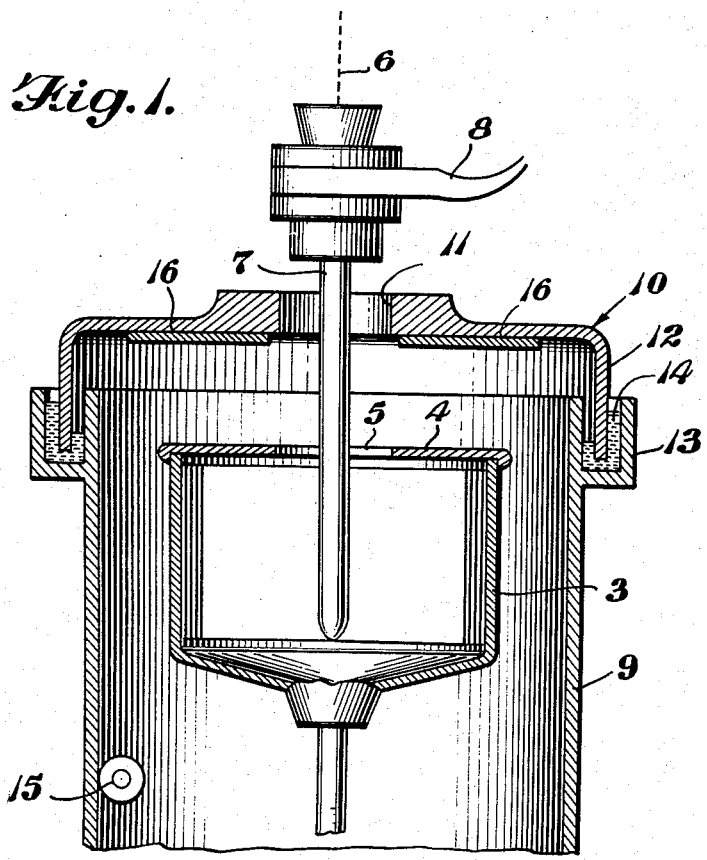

Aug. 25, 1942.                B. G. DE KLERK                2,293,970
                            MANUFACTURE OF RAYON
                            Filed Sept. 23, 1940

Inventor
BASTIAAN GIJSBERTUS de KLERK,
By Albin P. Haight
Attorney

Patented Aug. 25, 1942

2,293,970

UNITED STATES PATENT OFFICE 2,293,970

MANUFACTURE OF RAYON

Bastiaan Gijsbertus de Klerk, Arnhem, Netherlands, assignor to American Enka Corporation, Enka, N. C., a corporation of Delaware Application September 23, 1940, Serial No. 358,020
In the Netherlands December 1, 1939

5 Claims. (Cl. 57—76)

This invention relates to the manufacture of rayon and more particularly to the manufacture thereof by the centrifugal pot spinning process.

According to the centrifugal pot spinning process, freshly spun yarn, after withdrawal from a coagulating bath, is collected in the form of a cake in the interior of a spinning pot which is rotated at a very high rate of speed. The collection of yarn in the pot, which is effected by the action of centrifugal force on the yarn, is continued until a cake of suitable size has been built up. The cake so prepared is then removed from the pot and subjected to such aftertreatments as may be necessary in any particular instance.

When the centrifugal pot spinning process is applied to the manufacture of rayon from regenerated cellulose or viscose, it has been found that the collection of yarn in the centrifugal pot is accompanied by the release of noxious gases, which, if permitted to escape into the surrounding atmosphere, are injurious to the attendants operating the machinery employed. In order to avoid this contamination of the atmosphere surrounding a centrifugal pot by the release of noxious gases during the spinning process, it has been customary heretofore to enclose the revolving pot within a sealed chamber which is provided with a cover so that access to the pot may be had for removal of the spun cake, and to employ a suction mechanism by the use of which the atmosphere of the chamber surrounding the pot may be continuously withdrawn. Of course, the closure between the pot chamber and its cover is made as tight as possible in order to prevent the escape of gases, but it will be recognized that it is impossible to seal completely the pot chamber since a central opening must be provided in the cover thereof to permit the initial insertion of a guide funnel and the subsequent reciprocating movement thereof during the course of the preparation of the cake. It is customary to provide an opening in the cover of sufficient size to allow for lateral adjustment of the guide funnel to insure accurate centering of the same with respect to the centrifugal pot. While the pot is driven, air is drawn into the chamber through the opening in the cover by action of the suction means and is thrown out by centrifugal force against the side walls of the pot chamber. Thus, since the pressure within the pot chamber is generally subatmospheric, especially along the vertical axis thereof, the cover opening does not permit the escape of noxious gases.

The foregoing arrangement for the protection of the atmosphere in a plant for the manufacture of rayon from regenerated cellulose by the centrifugal pot spinning process was quite satisfactory as long as the chamber in which the pot was mounted was square. It was found, however, that the use of square chambers to surround centrifugal pots is disadvantageous because of the fact that the high pressure gas currents set up by centrifugal force exert a retarding effect upon the rotation of the pot, which effect must be overcome by the application of additional power to the pot driving mechanism. Inasmuch as during the spinning process the spinning pot is caused to revolve at a very high rate of speed, considerable power is expended in driving the same even under optimum conditions, and, when it is necessary to provide additional energy to overcome the retarding force of gas currents, it will be recognized that the arrangement is not an economical one. With a view to economizing with regard to the power necessary for driving a centrifugal pot, the use of the square pot chamber has been, to a large extent, discontinued and at present it is customary to employ a cylindrical chamber which imposes no obstacles to the gas currents set up by the rotation of the pot and consequently obviates the retarding effect of such currents. The circular pot chamber, while permitting the use of less power for driving the centrifugal pot, offers a disadvantage in that although the high gas pressure developed around the walls of the chamber does not interfere with or retard the rotation of the pot, such localized overpressure tends to break the seal between the cover and pot container thereby permitting the escape of noxious gases. Thus, due to the fan-like action of the revolving pot, the gases in the pot chamber are whirled around and thrown outwardly with considerable force against the junction of the pot chamber and its cover, thereby locally offsetting to a great extent the effect of the suction mechanism by which air is withdrawn from the chamber.

The gas pressure exerted at the junction of the chamber with its cover is so great that a gas-tight seal is very difficult to maintain. Thus, where it is sought to effect a seal by providing a fluid filled channel around the rim of the chamber proper, in which the rim of the cover is immersed, a very deep channel must be provided to prevent the gas pressure from breaking the seal by forcing out the sealing liquid. Therefore, in order to seal the pot chamber at the junction with its cover, a channel of such depth must be provided that it is difficult to remove the cover, and breakage of the edge of the pot or cover is a frequent occurrence.

The present invention overcomes this difficulty in a simple and effective manner and has as an object the reduction of gas pressure generated by the revolving pot, especially as regards its action at the point of seal between the pot chamber and its cover.

Another object of the invention is the provision of a method and apparatus for reducing the localized gas pressure in a chamber surrounding a spinning pot during the rotation of the pot without imposing additional resistance to the rotation of the pot.

By the employment of the present invention, it is contemplated that obstructions be placed in the path of whirling gas currents in such a way as to avoid the development of overpressures at the point of seal intermediate the cover and the pot chamber, while, at the same time, avoiding all interference with the guide funnel and the free rotation of the pot itself.

Figure 2:
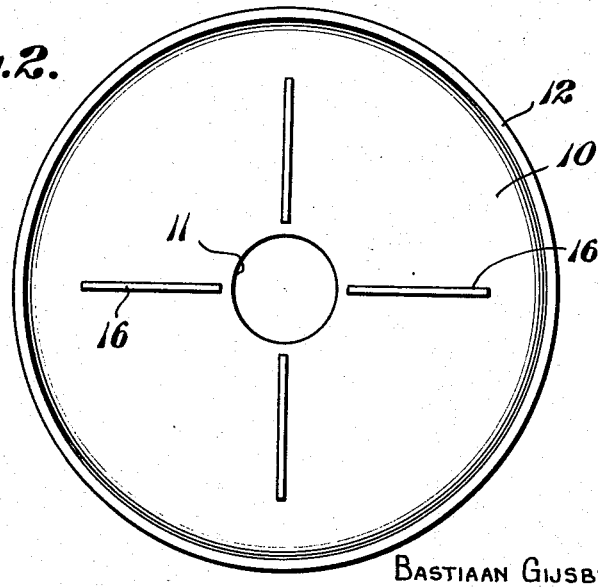

Other objects and advantages of this invention will be apparent from the consideration of the following detailed description in conjunction with the annexed drawing wherein:

Figure 1 is a view in transverse section of a centrifugal spinning pot and a portion of a chamber surrounding the same showing the cover in closed position; and Figure 2 is a bottom plan view of the cover for the spinning pot chamber shown in Figure 1.

Referring in greater detail to the drawing and more particularly to Figure 1 thereof, the numeral 3 designates a centrifugal spinning pot provided with the usual annular cover member 4 having a central opening 5 therein to define a passageway for thread 6 which is conducted into the spinning pot by means of a funnel guide 7. Funnel guide 7 is reciprocated in a vertical path through the intermediary of arm 8 to which the reciprocating motion is imparted by a suitable mechanism not shown.

Surrounding a centrifugal pot 3 is a cylindrical pot chamber 9 surmounted by a cover member 10 having a central aperture at 11 to permit passage of the thread 6 and funnel guide 7 therethrough. Cover 10 is provided with a depending flange 12 which is adapted to rest in a channel 13 which encircles the upper edge of chamber 9. In order to seal cover 10 and chamber 9 against leakage, a liquid 14 such as water is introduced into the channel 13.

While the lower portion of chamber 9 is broken off in Figure 1, it will be recognized that the chamber is suitably sealed at its base and that the drive shaft operating on spinning pot 3 is surrounded by suitable packing to prevent the leakage of gases from the interior of the chamber.

During the spinning process noxious gases pervade the space surrounding the centrifugal pot and these gases are constantly drawn off by means of a suction device, such, for example, as is shown at 15. However, as explained heretofore, due to the cylindrical shape of the interior of the chamber 9 and the high rotary speed of the pot, which stirs up the air in the manner of a fan, a high localized gas pressure is exerted in the region of the junction of the wall and cover of the pot chamber, so that liquid 14 is forced out of the channel 13 and noxious gases escape into the atmosphere. In order to reduce this gas pressure and to prevent the dissemination of gases into the atmosphere the inner face of cover member 10 is provided with the ribs 16, preferably radially arranged as shown in Figure 2.

Ribs 16 constituting baffles, provided on the cover 10, serve to break up the gas currents as they whirl about the inner face of the cover and thus reduce the gas pressure to such an extent that the noxious gases may be removed effectively by the suction device 15. The shape of the baffles or ribs 16 is, of course, subject to variation, although it has been found that the rectangular shape shown in the drawing is well adapted to the purpose for which the ribs are intended.

The dimensions to be chosen for the radial baffles and the number thereof may depend upon several factors, such as the diameter of the pot chamber and the rotary speed of the pot. By way of example, it can be stated that with a centrifugal pot 120 mm. in height and having an outside diameter of 190 mm., revolving at the rate of 6,200 R. P. M. in a cylindrical spinning pot chamber having an inside diameter of 230 mm., there is developed at the upper portion of the wall of the chamber an air pressure of 50 mm. water column in excess of atmospheric pressure. Now if the chamber cover is provided with four radial baffles 4 mm. high and 4 mm. wide the air pressure is reduced to 9 mm. water column.

Having now described the invention in its preferred form, it is understood that variations and modifications may be made therein without departing from the spirit of the invention, and it is desired that the scope thereof be limited only by the appended claims.

What is claimed is:

1. Apparatus for the manufacture of rayon yarn according to the centrifugal pot spinning method comprising, a driven centrifugal pot, means for supplying a yarn and for guiding the same into said pot, a cylindrical chamber enclosing said pot, a cover for said chamber, an opening in said cover through which gases are drawn into the space between said pot and said chamber, means for removing gases from within said chamber, and obstructions in the path of gas currents created by rotation of the pot whereby resistance to the development of high gas pressures within said chamber adjacent the cylindrical walls thereof is effected.

2. Apparatus for the manufacture of rayon yarn according to the centrifugal pot spinning method comprising, a driven centrifugal pot, means for supplying a yarn and for guiding the same into said pot, a chamber enclosing said pot, a cover for said chamber, an opening in said cover through which gases are drawn into the space between said pot and said chamber, means for removing gases from within said chamber, and obstructions associated with said cover for imposing a resistance to the development of high gas pressures adjacent the point of contact of said cover and chamber.

3. Apparatus for the manufacture of rayon yarn according to the centrifugal pot spinning method comprising, a driven centrifugal pot, means for supplying a yarn and for guiding the same into said pot, a cylindrical chamber enclosing said pot, a cover for said chamber, means for removing gases from within said chamber, and means associated with said cover for imposing a resistance to the development of high gas pressures within said chamber adjacent the cylindrical walls thereof, said last-named means comprising a plurality of radially disposed baffles projecting from the inner face of said cover.

4. In a centrifugal pot spinning apparatus, a centrifugal pot, means for guiding a thread into said pot, a chamber enclosing said pot, a cover for said chamber, a central opening in said cover, and a plurality of radial projections upon the inner face of said cover arranged in the path of travel of gas currents set up by the rotation of the said pot.

5. Apparatus for the manufacture of rayon yarn according to the centrifugal pot spinning method comprising, a driven centrifugal pot, means for supplying a yarn and for guiding the same into said pot, a cylindrical chamber enclosing said pot, a cover for said chamber, an opening in said cover through which gases are drawn into the space between said pot and said chamber, means for removing gases from within said chamber, and baffles arranged in the path of gas currents created by rotation of the pot for imposing a resistance to the development of high gas pressures adjacent the point of contact of said cover and chamber.

BASTIAAN GIJSBERTUS DE KLERK.